US012744832B2

(12) United States Patent
Nielsen et al.

(10) Patent No.: US 12,744,832 B2
(45) **Date of Patent: *Sep. 22, 2026**

(54) SYSTEMS AND METHODS FOR ENSURING CONTINUED ACCESS TO MEDIA OF A PLAYLIST DESPITE GEOGRAPHIC CONTENT RESTRICTIONS

(71) Applicant: Adeia Guides Inc., San Jose, CA (US)

(72) Inventors: Gorm Ward Nielsen, Cobham (GB); Milan Indu Patel, Santa Clara, CA (US); Stephanie Schaeffer, Luxembourg (LU); Vincent Lefevre, Florange (FR)

(73) Assignee: Adeia Guides Inc., San Jose, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 18/983,917

(22) Filed: Dec. 17, 2024

(65) Prior Publication Data

US 2025/0119476 A1 Apr. 10, 2025

Related U.S. Application Data

(63) Continuation of application No. 18/370,765, filed on Sep. 20, 2023, now Pat. No. 12,206,744, which is a (Continued)

(51) Int. Cl.
*H04L 67/52* (2022.01)
*G06Q 20/40* (2012.01)
(Continued)

(52) U.S. Cl.
CPC ............. *H04L 67/52* (2022.05); *G06Q 20/40* (2013.01); *H04L 65/4025* (2022.05);
(Continued)

(58) Field of Classification Search
CPC ..... H04L 67/52; H04L 67/306; H04L 65/765; H04L 65/612; H04L 65/611;
(Continued)

(56) References Cited

U.S. PATENT DOCUMENTS 6,239,794 B1 5/2001 Yuen et al.
6,564,378 B1 5/2003 Satterfield et al.
(Continued)

FOREIGN PATENT DOCUMENTS

GB 2510265 A * 7/2014 ............. G06Q 30/00
JP 2008065772 A 3/2008
(Continued)

*Primary Examiner* — Tauqir Hussain
(74) *Attorney, Agent, or Firm* — HG LAW LLP

(57) ABSTRACT

Systems and methods are described herein for detecting information that indicates that a user will be traveling from a first geographic location to a second geographic location, and responsively accessing a playlist indicated by a profile of the user that indicates a plurality of streaming media that the user intends to consume. Control circuitry may then compare data corresponding to each streaming media of the plurality of streaming media to a database to determine whether each streaming media of the plurality of streaming media is accessible to the user at the second geographic location, and may determine that a subset of the plurality of media is not accessible to the user at the second geographic location. In response to determining that the subset is not accessible to the user at the second geographic location, the control circuitry may download each media of the subset.

18 Claims, 6 Drawing Sheets

Related U.S. Application Data continuation of application No. 17/851,517, filed on Jun. 28, 2022, now Pat. No. 11,799,977, which is a continuation of application No. 16/529,087, filed on Aug. 1, 2019, now Pat. No. 11,405,473, which is a continuation of application No. 15/198,495, filed on Jun. 30, 2016, now Pat. No. 10,412,178.

(51) Int. Cl.

| | |
|---|---|
| ***H04L 65/402*** | (2022.01) |
| ***H04L 65/611*** | (2022.01) |
| ***H04L 65/612*** | (2022.01) |
| ***H04L 65/75*** | (2022.01) |
| ***H04L 67/306*** | (2022.01) |
| ***H04N 21/45*** | (2011.01) |
| ***H04N 21/4627*** | (2011.01) |
| ***H04N 21/482*** | (2011.01) |

(52) U.S. Cl.
CPC .......... *H04L 65/611* (2022.05); *H04L 65/612* (2022.05); *H04L 65/765* (2022.05); *H04L 67/306* (2013.01); *H04N 21/4524* (2013.01); *H04N 21/4825* (2013.01); *H04N 21/4627* (2013.01)

(58) Field of Classification Search
CPC ........... H04N 21/4524; H04N 21/4825; H04N 21/4627; G06Q 20/40
USPC .......................................................... 709/219
See application file for complete search history.

(56) References Cited

U.S. PATENT DOCUMENTS 7,165,098 B1 1/2007 Boyer et al.
7,761,892 B2 7/2010 Ellis et al.
8,046,801 B2 10/2011 Ellis et al.
8,402,387 B1 * 3/2013 Iversen .............. G06Q 30/0242 715/789
8,769,578 B2 7/2014 Lau et al.
8,799,973 B2 * 8/2014 Yasrebi .............. H04N 21/4668 725/105
8,923,883 B2 * 12/2014 Karaoguz ............. H04W 4/029 455/456.1
9,417,074 B2 * 8/2016 Leader ............... G01C 21/3617
9,503,849 B1 * 11/2016 Gavade ................. H04W 12/64
9,648,369 B2 * 5/2017 Frazier ............... H04N 21/4532
9,819,987 B2 11/2017 Reddy et al.
10,068,101 B2 * 9/2018 Durham .................. H04L 63/20
10,334,502 B2 * 6/2019 Skaaksrud .......... H04L 67/1023
10,412,178 B2 * 9/2019 Nielsen .............. H04N 21/4825
11,245,967 B2 * 2/2022 Christie ............. H04N 21/2187
11,405,473 B2 * 8/2022 Nielsen ................. H04L 67/306
12,612,062 B2 * 4/2026 Valavanur Umasankar ................ B60W 50/14
2002/0174430 A1 11/2002 Ellis et al.
2005/0028208 A1 * 2/2005 Ellis .................. H04N 21/4755 348/E7.071
2005/0251827 A1 11/2005 Ellis et al.
2006/0106676 A1 5/2006 Nathan et al.
2008/0040328 A1 * 2/2008 Verosub ................ G06F 16/958
2009/0157583 A1 * 6/2009 Couckuyt .......... G06Q 30/0273 705/14.69
2009/0165049 A1 * 6/2009 Sekiguchi ........ H04N 21/25841 725/39
2009/0276722 A1 * 11/2009 Segel ...................... G06F 16/48 715/765
2009/0307741 A1 12/2009 Casagrande
2010/0153885 A1 6/2010 Yates
2010/0205628 A1 8/2010 Davis et al.
2010/0211636 A1 * 8/2010 Starkenburg ....... H04N 21/4821 709/224
2011/0237184 A1 * 9/2011 Minoshima ...... G08G 1/096883 455/39
2011/0264685 A1 10/2011 Cheng
2011/0314502 A1 * 12/2011 Levy .................. H04N 21/4532 725/46
2012/0303659 A1 * 11/2012 Erhart ..................... H04L 61/30 709/204
2013/0103300 A1 * 4/2013 Rakthanmanon .. G01C 21/3492 701/400
2013/0151659 A1 6/2013 Alberth et al.
2013/0218838 A1 * 8/2013 Bevan ..................... G06F 16/00 707/626
2013/0227068 A1 * 8/2013 Yasrebi ............ H04N 21/25883 709/217
2013/0317919 A1 11/2013 Raman et al.
2013/0325609 A1 12/2013 Sokolov et al.
2013/0344896 A1 * 12/2013 Kirmse ............... G06F 16/9537 455/456.3
2014/0007146 A1 1/2014 Peterson et al.
2014/0092730 A1 * 4/2014 Yang ..................... H04W 4/021 370/229
2014/0199980 A1 * 7/2014 Rao ......................... H04W 4/18 455/418
2014/0229102 A1 * 8/2014 Bapna .................. G06Q 10/025 701/491
2014/0280303 A1 9/2014 Jain et al.
2015/0296519 A1 * 10/2015 Herger .................. H04W 72/52 370/230
2015/0304435 A1 * 10/2015 Bravo ................... H04L 63/107 726/7
2016/0014194 A1 * 1/2016 Kaplinger ............... H04L 67/52 709/217
2017/0235884 A1 * 8/2017 Harmon ................. G16H 40/20 705/2
2017/0352113 A1 * 12/2017 Delaney ................. G06Q 10/10
2020/0098258 A1 * 3/2020 Morris .................... G06F 16/29
2021/0360608 A1 * 11/2021 Chakraborty ......... H04W 72/51
2022/0407934 A1 12/2022 Nielsen et al.
2024/0015229 A1 1/2024 Nielsen et al.

FOREIGN PATENT DOCUMENTS

JP 2008294537 A 12/2008
WO 2013174018 A1 11/2013

* cited by examiner

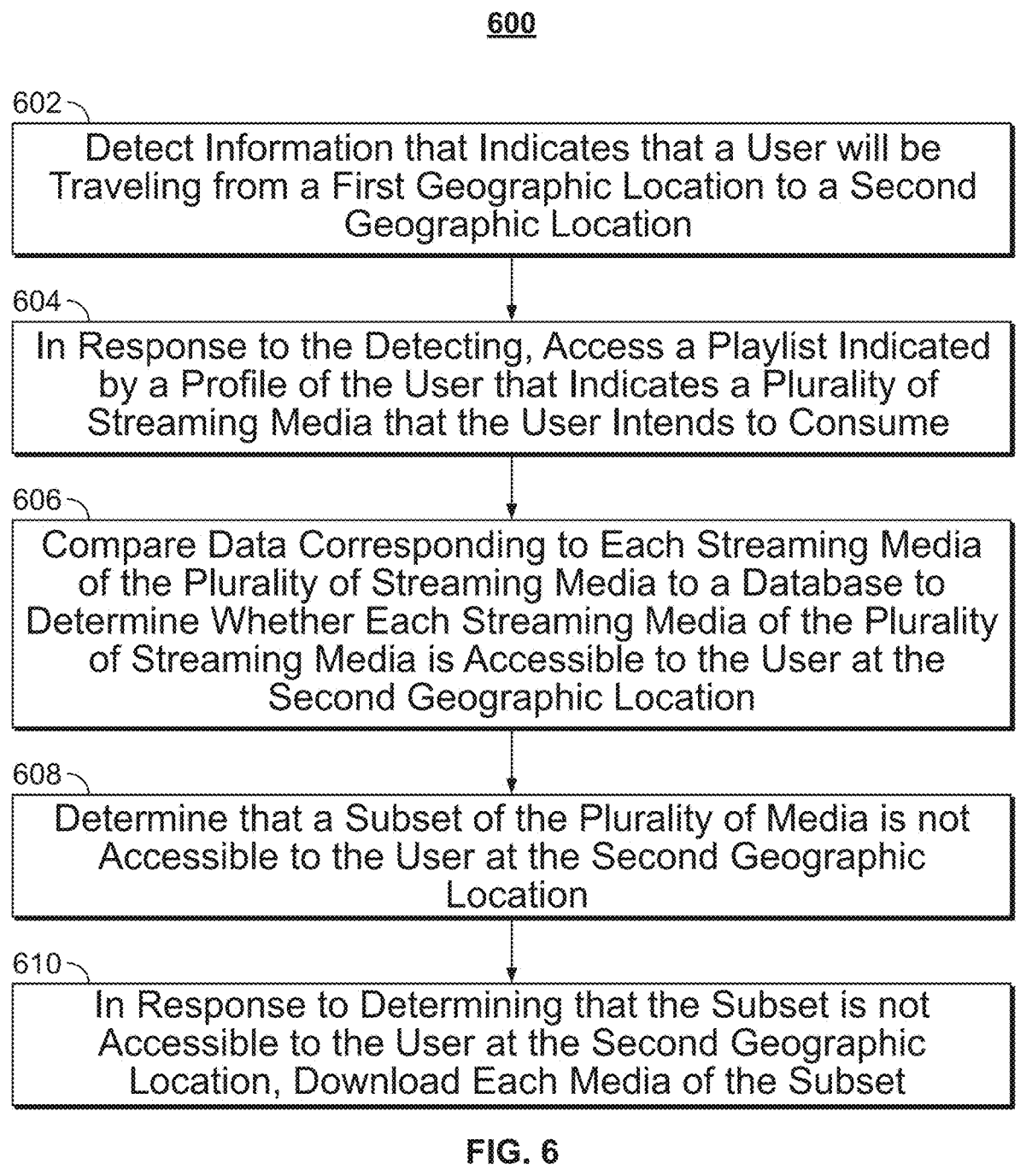

600

602 — Detect Information that Indicates that a User will be Traveling from a First Geographic Location to a Second Geographic Location 604 — In Response to the Detecting, Access a Playlist Indicated by a Profile of the User that Indicates a Plurality of Streaming Media that the User Intends to Consume 606 — Compare Data Corresponding to Each Streaming Media of the Plurality of Streaming Media to a Database to Determine Whether Each Streaming Media of the Plurality of Streaming Media is Accessible to the User at the Second Geographic Location 608 — Determine that a Subset of the Plurality of Media is not Accessible to the User at the Second Geographic Location 610 — In Response to Determining that the Subset is not Accessible to the User at the Second Geographic Location, Download Each Media of the Subset

FIG. 6

SYSTEMS AND METHODS FOR ENSURING CONTINUED ACCESS TO MEDIA OF A PLAYLIST DESPITE GEOGRAPHIC CONTENT RESTRICTIONS

CROSS-REFERENCE TO RELATED APPLICATIONS

This application is a continuation of U.S. patent application Ser. No. 18/370,765, filed Sep. 20, 2023 (now allowed), which is a continuation of U.S. patent application Ser. No. 17/851,517, filed Jun. 28, 2022, now U.S. Pat. No. 11,799, 977, which is a continuation of U.S. patent application Ser. No. 16/529,087, filed Aug. 1, 2019, now U.S. Pat. No. 11,405,473, which is a continuation of U.S. patent application Ser. No. 15/198,495, filed Jun. 30, 2016, now U.S. Pat. No. 10,412,178, the disclosure of which are hereby incorporated by reference herein in their entireties.

BACKGROUND

In related art, a user may input into an electronic program guide ("EPG") that the user will be traveling to a different country. The user may view an EPG screen that lists broadcast schedule information corresponding to his home location, and may view a different EPG screen that lists broadcast schedule information corresponding to the different country, and may make determinations as to whether he wants to record programming that is not available at his destination. The related art, however, is limited to enabling a user to identify content availability from broadcast program guides, and does not contemplate any information about content availability from any source other than broadcast program guides. Moreover, the related art is limited to manual interactivity between the user and the EPG, and is labor intensive.

SUMMARY

Systems and methods are provided herein for ensuring access to streaming media of a playlist despite geographic content restrictions on the streaming media. The systems and methods described herein may detect that a user is to travel to a different geographic location (e.g., by parsing the user's e-mail or calendar to learn of a travel itinerary), and may automatically determine that streaming media that the user enjoys watching is not available at the different geographic location (e.g., due to geography-based content restrictions). The systems and methods described herein may ensure that the user is able to access desired streaming media by locating downloadable versions of the streaming media and downloading it to user equipment, so that the user can take the content with him and circumvent an ability to access the media when the user has arrived at his destination.

To these ends and other ends, in some aspects of the disclosure, media guidance application may detect information that indicates that a user will be traveling from a first geographic location to a second geographic location. For example, the media guidance application may locate an entry in a calendar of a user that indicates that the user is flying from New York, USA to Milan, Italy.

In some embodiments, in response to the detecting (e.g., the detecting of the user traveling to Milan), the media guidance application may access a playlist indicated by a profile of the user that indicates a plurality of streaming media that the user likes or might consume, and may compare data corresponding to each streaming media of the plurality of streaming media to entries of one or more databases to determine whether each streaming media of the plurality of streaming media is accessible to the user at the second geographic location. For example, the user may subscribe to a media streaming service (e.g., Spotify for music streaming, Netflix for video streaming), or to an aggregate service where the user can access streaming media from other media streaming services. The user may proactively maintain a list of media he wishes to consume in the future, or a profile may indicate media that the user is likely to want to consume in the future. On the basis of these lists or on the user's profile, the media guidance application may determine that a user enjoys a particular show but will not be able to stream it due to the user's travel, for example, by comparing title corresponding to the media to available titles at the destination.

In some embodiments, the media guidance application may determine that a subset of the plurality of media is not accessible to the user at the second geographic location. For example, if a user enjoys ten video assets that are available for streaming in New York, but two of them are not available in Milan, the media guidance application may determine that the two that are not available in Milan form a subset of media that is not accessible to the user at the second geographic location. In response to determining that the subset is not accessible to the user at the second geographic location, the media guidance application may download each media of the subset. For example, the media guidance application may locate downloadable versions of the two video assets from an Internet video shop, such as Apple's iTunes shop, and may download the downloadable version to a device owned by the user. This way, the user may carry the downloaded videos to Milan and consume the downloaded videos without interruption, as the streaming restriction in Milan will not prevent the user from accessing the downloaded videos.

In some embodiments, when the media guidance application is determining the information that indicates that the user will be traveling from the first geographic location to the second geographic location, the media guidance application may receive an electronic communication that is addressed to the user, such as an e-mail from an airline company that includes an itinerary. The media guidance application may determine that content of the electronic communication references travel (e.g., because the electronic communication is from an airline company, or because the electronic communication indicates a destination and a travel date). The media guidance application may then identify, based on the profile, a home address of the first user (e.g., to learn where the user generally is able to access streaming content), and may parse the content of the electronic communication to identify an address other than the home address (e.g., the destination of Milan, Italy). In response to identifying the address other than the home address, the media guidance application may determine the second geographic location to be the address other than the home address (e.g., may learn to check into content restrictions in Milan, Italy).

In some embodiments, the plurality of streaming media is associated with a streaming media provider (e.g., Netflix, which provides streaming videos, or Spotify, which provides streaming music). Moreover, the database may indicate geographic content restrictions for the streaming media provider, such as associations between media and various countries and locations in which the media is not available. The media guidance application may, when determining that the subset of the plurality of media is not accessible to the user at the second geographic location, identify that media of the subset is indicated as restricted at the second geographic location in the database.

In some embodiments, the database (e.g., reference database) or databases may indicate content that is available at a given geographic location from the streaming media provider. In such embodiments, the media guidance application may determine that the subset of the plurality of media is not accessible to the user at the second geographic location by identifying that media of the subset is not indicated as available at the second geographic location in the database.

In some embodiments, the media guidance application may, when downloading each media of the subset, first identify a most suitable user equipment of a plurality of user equipment owned by the user for traveling with the user. For example, a portable user equipment with a large screen and long battery life, such as a tablet, may be selected if owned by the user. The media guidance application may then download each media of the subset to the most suitable user equipment.

In some embodiments, the media guidance application may, when downloading each media of the subset, first determine a user equipment of a plurality of user equipment owned by the user to download each media of the subset to based on a setting. For example, the user may have designated a user equipment that he prefers traveling with as a user equipment to which media should be downloaded. The media guidance application may then download each media of the subset to the user equipment.

In some embodiments, the user equipment may have insufficient capacity to store each media of the subset (e.g., due to hard drive limitations, such as limited hard drive space on tablet computers). The media guidance application may, in this instance, automatically select a portion of the subset for storing based on preferences indicated in the profile. For example, if the user favors action movies, the limited storage space may be used to download action movies instead of other media.

In some embodiments, when the user equipment has insufficient capacity to store each media of the subset, the media guidance application may generate for display an alert to the user indicating that the user equipment has insufficient capacity to store each media of the subset, and may receive a selection from the user of a portion of the subset for storing (e.g., of a particular media that the user favors). In response to receiving the selection, the media guidance application may download the portion of the subset.

In some embodiments, the media guidance application may, in response to determining that the subset is not accessible to the user at the second geographic location, proceed to identify respective locations where a respective downloadable file corresponding to each streaming media of the plurality of streaming media is available for downloading. For example, the media guidance application may determine that some streaming media is available from a particular online store, such as Apple's iTunes store. The media guidance application may automatically download the respective downloadable files if the downloadable files are available without payment of money. However, if a respective downloadable file requires purchase, the media guidance application may prompt the user as to whether the user authorizes purchase of the respective downloadable file.

In some embodiments, a media guidance application may receive a destination geographical location to which a user intends to travel (e.g., by way of an electronic communication). The media guidance application may automatically determine whether media content that the user intends to consume is not accessible for consumption at the destination geographical location, and may, in response to determining that the media content is not accessible for consumption at the destination geographical location, automatically download the media content to user equipment at the home location.

In some embodiments, the media guidance application may receive a destination geographical location to which a user intends to travel, and may identify a plurality of media assets that are accessible for consumption at a home location of the user, where the user is likely to want to consume each of the plurality of media assets at the destination location. For example, the plurality of media assets may be a playlist.

The media guidance application may then automatically determine, for each respective media asset of the plurality of media assets, whether the respective media asset is not accessible for consumption at the destination geographical location, and may add each respective media asset that is not accessible for consumption at the destination geographical location to a subset. Finally, the media guidance application may invoke a function on the subset, where the function comprises at least one of: (1) automatically downloading each media asset of the subset to user equipment at the home location, and (2) automatically downloading each media asset of the plurality of media assets other than media assets of the subset to the user equipment at the home location.

In some embodiments, the media guidance application may receive a destination geographical location to which a user intends to travel, and may receive a playlist associated with the user, where the playlist comprises one or more media asset identifiers, and where each media asset identifier corresponds to a respective media asset. The media guidance application may automatically determine, for each respective media asset, (1) whether the respective media asset is not accessible for consumption at the destination geographical location (e.g., due to licensing restrictions), and (2) whether the respective media asset is restricted at the destination geographical location (e.g., due to the content being illegal in that country), and may then automatically download, based on the determining, only the respective media assets that are both (1) not accessible for consumption at the destination location, (2) not restricted at the destination location.

BRIEF DESCRIPTION OF THE DRAWINGS

FIG. 6 depicts an illustrative flowchart of a process for ensuring seamless access to restricted streaming media at a destination, in accordance with some embodiments of the disclosure;

DETAILED DESCRIPTION

Figure 1:
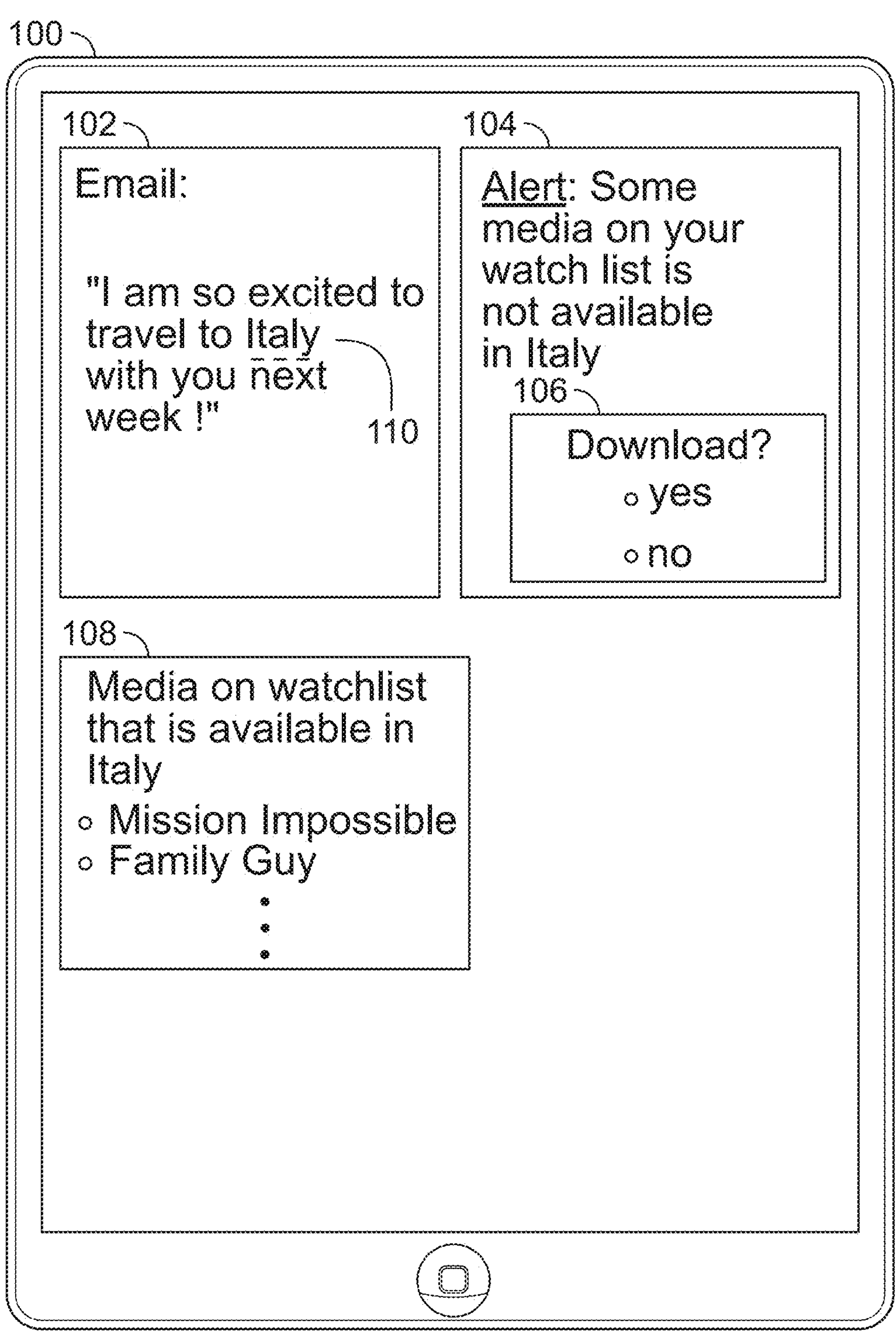
FIG. 1 depicts an illustrative embodiment of a user interface that informs a user about content restrictions at a destination, in accordance with some embodiments of the disclosure.

FIG. 1 depicts an illustrative embodiment of a user interface that informs a user about content restrictions at a destination, in accordance with some embodiments of the disclosure. User equipment 100 is depicted as a tablet, but may be any user equipment with any functionality described below with respect to FIGS. 2-5. User equipment 100 comprises control circuitry (also described further below with respect to FIGS. 2-5) which executes a media guidance application (which again is described further below with respect to FIGS. 2-5).

The media guidance application may generate for display, either on a display of user equipment 100 or on a display of a different device, electronic communication 102, alert 104, selectable option 106, and information window 108. Electronic communication 102 may be any electronic communication that includes information about a user, such as an e-mail, an MMS or SMS message, calendar information input by a user or automatically populated by the media guidance application, and any other known electronic communication. Information described as parsed or gleaned from electronic communication 102 may also be obtained from a user profile in accordance with some embodiments of the disclosure.

In some embodiments, the media guidance application may detect information that indicates that a user will be traveling from a first geographic location to a second geographic location. For example, the media guidance application may determine based on electronic communication 102 that a user of user equipment 100 will be flying from New York, USA to Milan, Italy. For example, electronic communication 102 may be an e-mail from an airline company that includes an itinerary. In some embodiments, electronic communication 102 may be a message from a third party platform that directly informs the media guidance application that the user will be traveling to the second geographic location (e.g., an airline or travel application installed on a user's smartphone or tablet). The media guidance application may determine that content of the electronic communication references travel (e.g., because the electronic communication is from an airline company, or because the electronic communication indicates a destination (e.g., destination 110) and a travel date). The media guidance application may then identify, based on the profile, a home address of the first user (e.g., to learn where the user generally is able to access streaming content), and may parse the content of the electronic communication to identify an address other than the home address (e.g., the destination of Milan, Italy). In response to identifying the address other than the home address, the media guidance application may determine the second geographic location to be the address other than the home address (e.g., may learn to check into content restrictions in Milan, Italy).

The media guidance application may similarly process any electronic communication 102. For example, information may be parsed from a calendar entry, an MMS message, a voice communication with another user that was detected by a user input interface (user input interfaces are described below with respect to FIGS. 2-5), or any other communication. Parsing may occur by comparing text to a database of known words that indicate travel, such as country, state, and city names, airline names, train company names, and any other words that indicate travel. Parsing may also occur based on credit card, bank, and purchase statements (which may indicate that travel was purchased) and by any other means.

In some embodiments, in response to the detecting (e.g., the detecting of the user traveling to Milan), the media guidance application may access a playlist indicated by a profile of the user that indicates a plurality of streaming media that the user intends to consume. For example, the user may subscribe to a media streaming service (e.g., Spotify for music streaming, Netflix for video streaming), or to an aggregate service where the user can access streaming media from other media streaming services. Video streaming services commonly allow users to populate a watch list, which is a list of media that the user desires to watch in the near future. Video streaming services and other video services also describe wish lists, where a user indicates media he wishes to purchase in the near future. Playlists are also often used not only in video services, but also in music services, and playlists indicate media that users wish to consume in the near future in a specified order.

Using any of these lists, the user may proactively maintain a list of media he wishes to consume in the future. Alternatively, a profile may indicate media that the user is likely to want to consume in the future. For example, a profile may indicate that a user generally views episodes of a certain series within a few days of when those episodes are available, or may indicate that a user has begun viewing some episodes of a series and thus is likely to desire continued access to the remaining episodes of the series.

On the basis of these lists or on the basis of information in the user's profile, the media guidance application may determine that a user enjoys a particular show but will not be able to stream it due to the user's travel. For example, in some embodiments, the media guidance application may compare data corresponding to each streaming media of the plurality of streaming media to a database to determine whether each streaming media of the plurality of streaming media is accessible to the user at the second geographic location. The data that may be compared to the database may be any type of data corresponding to media, such as title, production company, distribution company, or any other data that may be used as a basis for a content restriction by a media provider such as a media streaming provider.

In some embodiments, the plurality of streaming media is associated with a particular streaming media provider (e.g., Netflix, which provides streaming videos, or Spotify, which provides streaming music). For example, media streaming providers like Netflix provide different content to subscribers in different countries. The different content is often due to licensing restrictions placed on content distribution by the owners of the media. Thus, the database may indicate geographic content restrictions for the particular streaming media provider, such as associations between media and various countries and locations in which the media is available or is not available. The media guidance application may, when determining that the subset of the plurality of media is or is not accessible to the user at the second geographic location, identify that media of the subset is indicated as available or restricted at the second geographic location in the reference databases. Database operations are described in further detail below with respect to FIGS. 2-5.

When the media guidance application determines that a subset of media is not available at the user's destination (e.g., Milan, Italy), the media guidance application may alert the user of this fact by way of alert 104. Alert 104 may indicate that media is not available in a destination location. If electronic communication 102 indicates that the user is traveling to multiple destinations, alert 104 may indicate content restrictions and accessibility in multiple locations. Moreover, the media guidance application may generate for display selectable option 106 concurrently with alert 104 (or separately from alert 104) with an option to download the media that will be inaccessible at a given destination. Download operations and functionality are described in further detail below.

In some embodiments, the media guidance application may determine that a subset of the plurality of media is not accessible to the user at the second geographic location. For example, if a user enjoys ten video assets that are available for streaming in New York, but two of them are not available in Milan, the media guidance application may determine that the two that are not available in Milan form a subset of media that is not accessible to the user at the second geographic location. In response to determining that the subset is not accessible to the user at the second geographic location, the media guidance application may download each media of the subset. For example, the media guidance application may locate downloadable versions of the two video assets from an Internet video shop, such as Apple's iTunes shop, and may download the downloadable version to a device owned by the user. This way, the user may carry the downloaded videos to Milan and consume the downloaded videos without interruption, as the streaming restriction in Milan will not prevent the user from accessing the downloaded videos.

In some embodiments, the media guidance application may, when downloading each media of the subset, first identify a most suitable user equipment of a plurality of user equipment owned by the user for traveling with the user. For example, a user may own many user equipment in addition to user equipment 100. The user may own a mobile telephone, a tablet computer, a laptop computer, a wearable device such as a smart watch, television equipment, and the like. Each of these user equipment may have various size, weight, memory, and capability attributes. For example, a tablet computer may have a small weight and a nice screen for viewing video assets, but may also have limited capacity and not be able to hold many downloaded video assets in its memory. Thus, the media guidance application may then download each media of the subset to the most suitable user equipment.

The most suitable user equipment may be determined based on objective data, such as a portable device that is capable of carrying all desired media assets in downloaded form, or one that is capable of displaying media in optimal formats (e.g., HD or 4K), or may be determined based on subjective data, such as user preferences. Selecting a most suitable device is described in further detail in U.S. patent application Ser. No. 12/771,502, filed Apr. 30, 2010, published as U.S. Pat. App. Pub. No. 2010/0211636, now abandoned, and U.S. Pat. No. 8,769,578, issued Jul. 1, 2014, each of which are hereby incorporated by reference herein in their entireties.

In some embodiments, the media guidance application may, when downloading each media of the subset, first determine a user equipment of a plurality of user equipment owned by the user to download each media of the subset to based on a setting (as opposed to doing so based on a most suitable device). The setting may be designated by a user. For example, the user may have designated a user equipment that he prefers traveling with as a user equipment to which media should be downloaded. The media guidance application may then download each media of the subset to the user equipment. The setting may also be automatically determined by the media guidance application. For example, the media guidance application may apply a setting based on prior activity (e.g., if the user selects a given device for his past 3 trips, the media guidance application may automatically select the given device for downloading the media the next time the user travels).

In some embodiments, the user equipment may have insufficient capacity to store each media of the subset (e.g., due to hard drive limitations, such as limited hard drive space on tablet computers). The media guidance application may, in this instance, automatically select a portion of the subset for storing based on preferences indicated in the profile. For example, if the user favors action movies, the media guidance application may use the limited storage to download action movies instead of other media. If preferences are not indicated in the profile, the media guidance application may determine which media to download based on any other factor, such as maximizing the number of media assets that are downloaded. Moreover, the media guidance application may seek lower quality versions of the downloadable media in order to ensure more downloadable media fits on the selected user equipment.

In some embodiments, when the user equipment has insufficient capacity to store each media of the subset, the media guidance application may generate for display an alert to the user (e.g., alert 104) indicating that the user equipment has insufficient capacity to store each media of the subset, and may receive a selection from the user of a portion of the subset for storing (e.g., of a particular media that the user favors). The information may contain information similar to that of information window 108, which includes a list of media available in a given location. Information window 108 may indicate the subset, and may be interactive so that the media guidance application receives user selections of which portion should be stored. In response to receiving the selection, the media guidance application may download the portion of the subset. The portion may be alternatively selected automatically based on any factor, such as user preferences, or based on whether a media is free or costs relatively less than other media costs.

In some embodiments, the media guidance application may, in response to determining that the subset is not accessible to the user at the second geographic location, proceed to identify respective locations where a respective downloadable file corresponding to each streaming media of the plurality of streaming media is available for downloading. For example, the media guidance application may determine that some streaming media is available in downloadable form from a particular online store, such as Apple's iTunes store, and other streaming media is available in downloadable form for free (e.g., due to a promotion on a given website). The media guidance application may automatically download the respective downloadable files if the downloadable files are available without payment of money.

In some embodiments, if a respective downloadable file requires purchase, the media guidance application may prompt the user as to whether the user authorizes purchase of the respective downloadable file (e.g., by way of alert 104 or selectable option 106). The media guidance application may then receive a user selection of whether the user wishes to purchase the respective downloadable file. Alternatively, or additionally, the media guidance application may have default or user-input settings that automatically dictate whether a given media should be downloaded. For example, a user may indicate that if a media costs below a threshold amount, or if a subset in its totality costs below a threshold amount to obtain, then the media may be automatically downloaded, and if not, it should either not be downloaded, or the user should be contacted for permission. To this end, the media guidance application may seek out the lowest-cost method of obtaining the downloadable media files. Seeking out a lowest-cost method of obtaining media is described in U.S. patent application Ser. No. 13/535,053, filed Jun. 27, 2012, currently pending, which was published as U.S. Pat. App. Pub. No. 2014/0007146, the contents of which are hereby incorporated by reference herein in their entirety.

In some embodiments, the media guidance application may determine that the user generally views media in the company of friends or family. The media guidance application may consider watch lists or future viewing preferences of the friends or family when generating for display alert 104, and may incorporate the viewing preferences of the friends or family in alert 104.

In some embodiments, the media guidance application may enable the user to carry restricted content with him when the user travels, but may prevent the user from consuming the content in geographical locations where the content is restricted. The media guidance application may detect that the user has entered a geographical location where content is restricted (e.g., Milan, Italy), and may responsively store the media in a part of the device that is not accessible while in Milan, Italy, or may simply disable access to that media while the user is in Milan, Italy.

In some embodiments, the media guidance application may refrain from downloading the restricted content in the first place, and may download replacement content that is similar to the restricted content, or may download other content of the user's playlist. For example, in some embodiments, media content may be unavailable in a given country due to licensing restrictions. In some scenarios, though, some media content may actually be illegal in some geographic locations, rather than simply unavailable. In these scenarios, the media guidance application may automatically download the unavailable content, but refrain from downloading the restricted (e.g., illegal) content.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
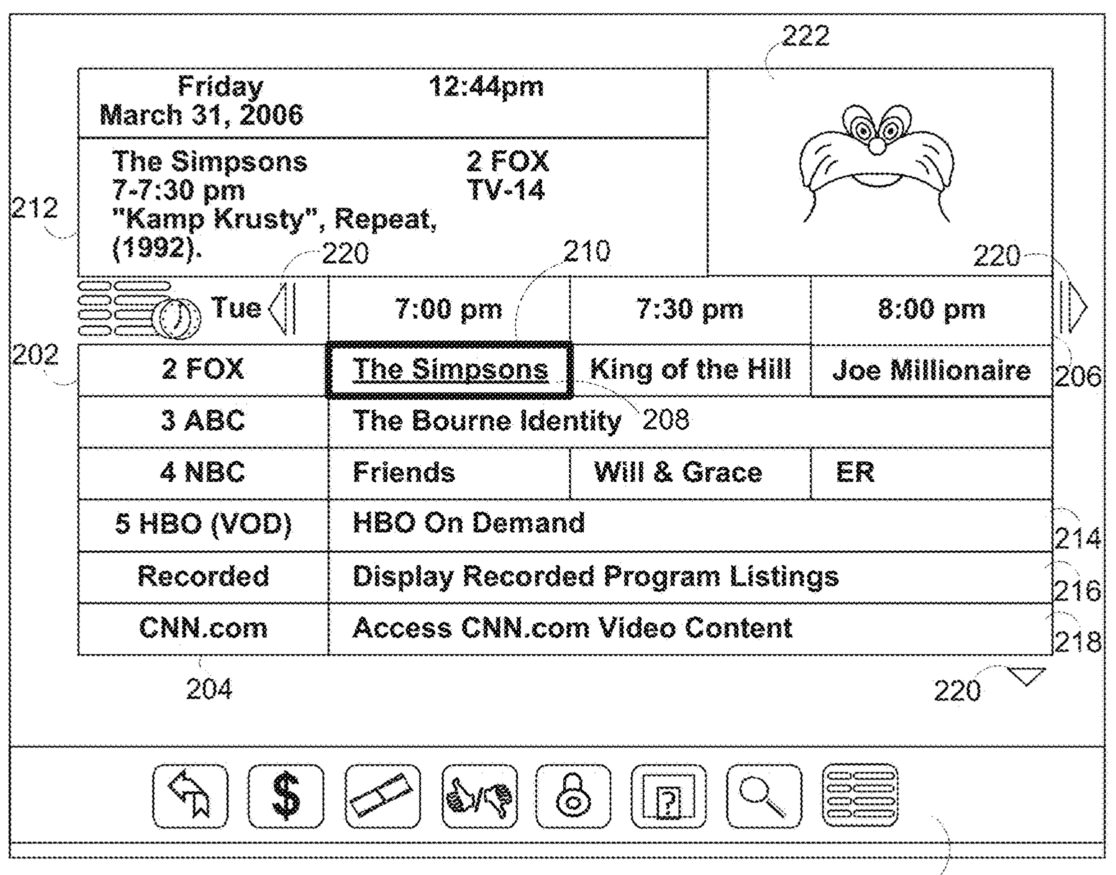
FIG. 2 shows an illustrative embodiment of a display screen that may be used to provide media guidance application listings and other media guidance information, in accordance with some embodiments of the disclosure.
Figure 3:
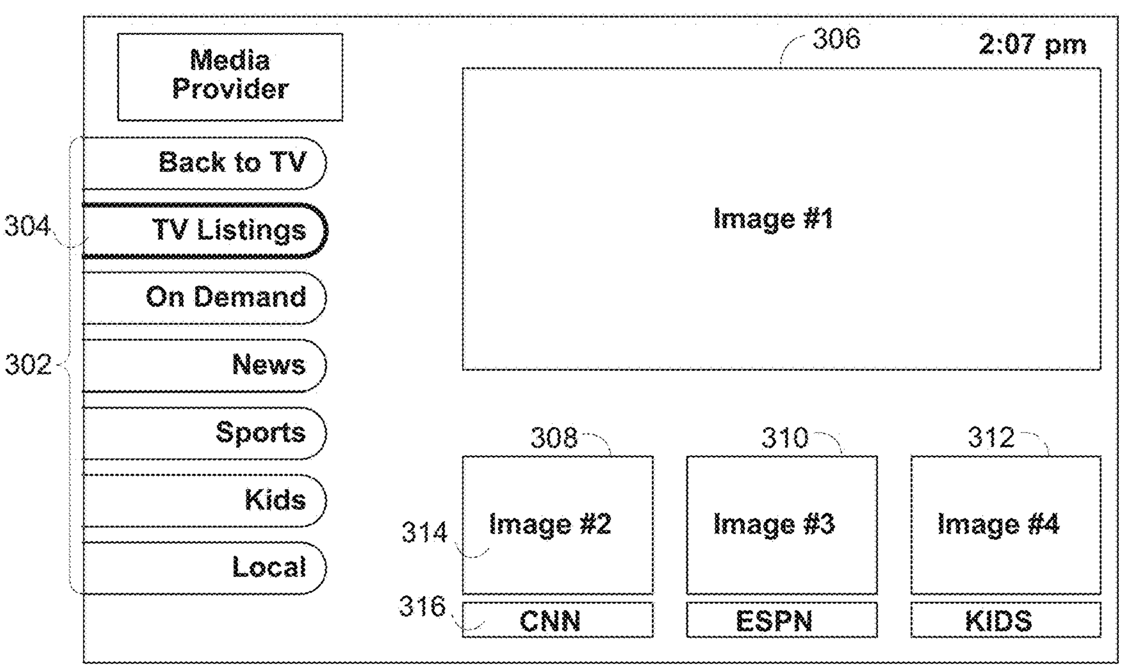
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences.

Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
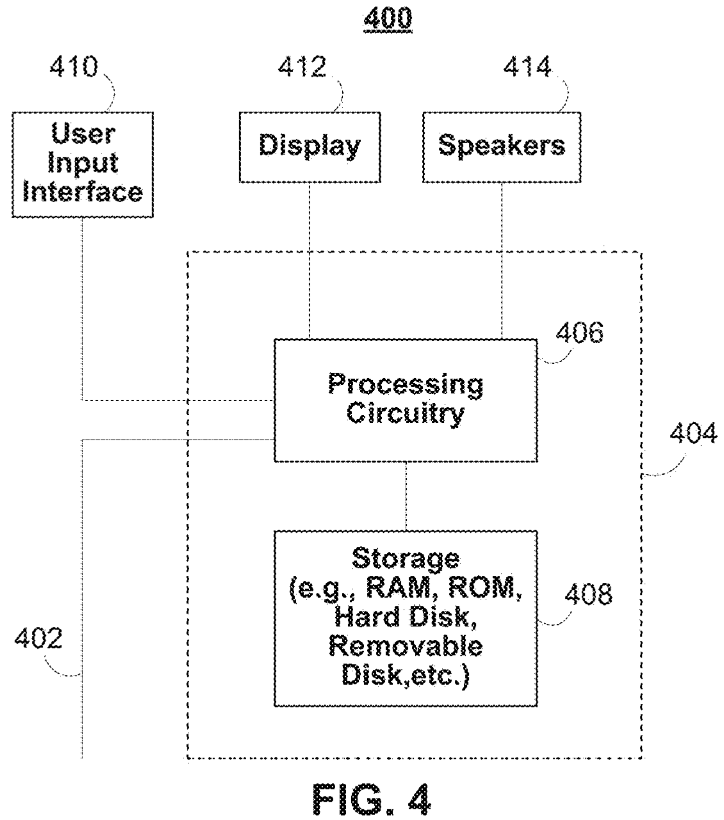
FIG. 4 is a block diagram of an illustrative user equipment (UE) device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
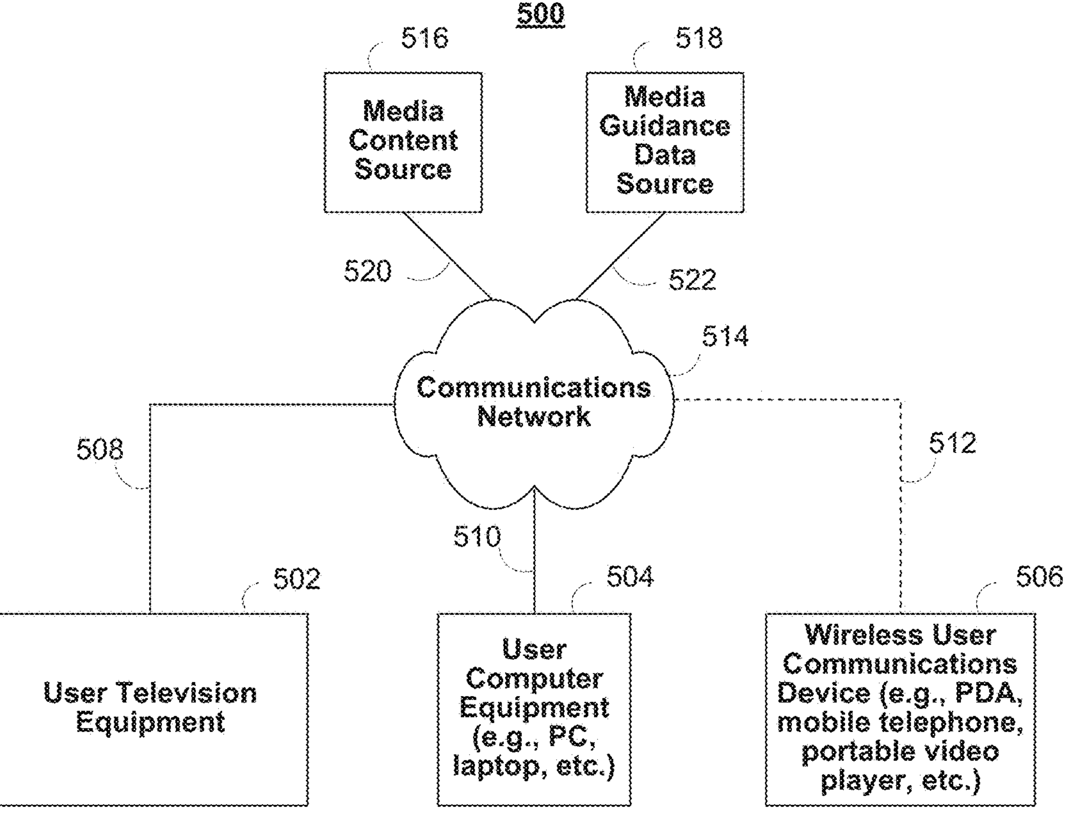
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

FIG. 6 depicts an illustrative flowchart of a process for ensuring seamless access to restricted streaming media at a destination, in accordance with some embodiments of the disclosure. Process 600 begins at 602, where control circuitry 404 of user equipment 100 executes a media guidance application that detects information that indicates that a user will be traveling from a first geographic location to a second geographic location. User equipment 100 may comprise functionality of any of user television equipment 502, user computer equipment 504, wireless user communications device 506, or any other type of user equipment suitable for accessing content. The information may be detected from electronic communication 102, as was described above and below.

Process 600 may continue to 604, where the media guidance application may, in response to the detecting, access a playlist indicated by a profile of the user that indicates a plurality of streaming media that the user intends to consume. The playlist and profile may be stored locally at storage 408, or remotely at media guidance data source 518 or media content source 516, which are accessible by way of communications network 514. The playlist and profile are described in greater detail in the foregoing.

Process 600 may continue to 606, where the media guidance application may compare data corresponding to each streaming media of the plurality of streaming media to entries of a database to determine whether each streaming media of the plurality of streaming media is accessible to the user at the second geographic location. The database may be media content source 516 or media guidance data source 518 (accessible by communications network 514), and may indicate whether content restrictions exist, or whether media is available, in any given country, as described in the foregoing. The database may be specific to a media provider, as described in the foregoing.

Process 600 may continue to 608, where the media guidance application may determine that a subset of the plurality of media is not accessible to the user at the second geographic location. For example, the determination may be made based on the subset being indicated as not available by the database, as described with reference to 606. Process 600 may continue to 610, where, in response to determining that the subset is not accessible to the user at the second geographic location, the media guidance application may download each media of the subset. For example, the media guidance application may download each media of the subset by way of communications network 514 fro media content source 516 to storage 408 of user equipment 100.

Figure 7:
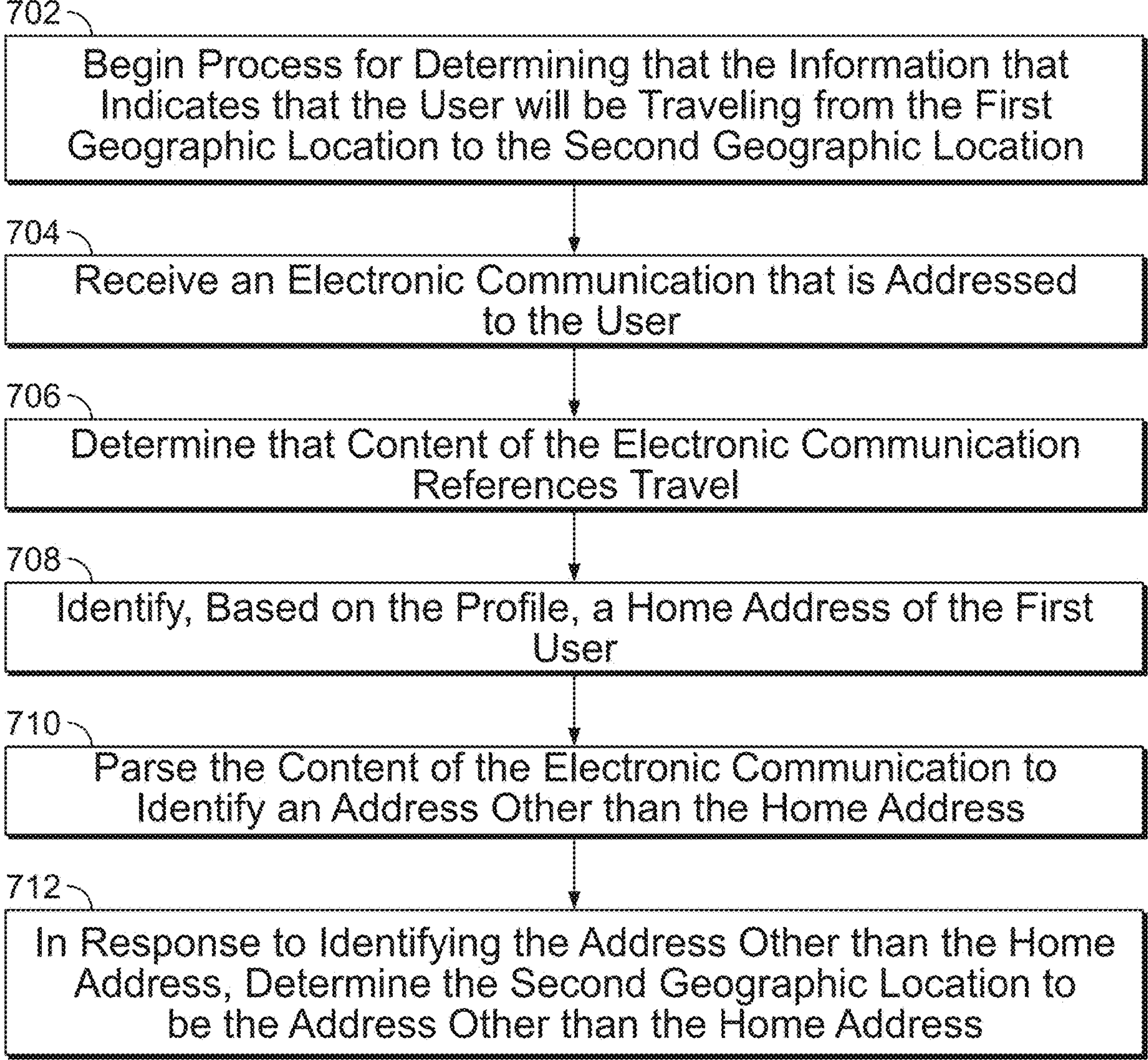
FIG. 7 depicts an illustrative flowchart of a process for determining that the user will be traveling from the first geographic location to the second geographic location, in accordance with some embodiments of the disclosure.

FIG. 7 depicts an illustrative flowchart of a process for determining that the user will be traveling from the first geographic location to the second geographic location, in accordance with some embodiments of the disclosure. Process 700 begins at 702, where the media guidance application begins a process for determining that the information that indicates that the user will be traveling from the first geographic location to the second geographic location (e.g., a subroutine for 602 or 608). Process 700 continues to 704, where the media guidance application of user equipment 100 receives an electronic communication that is addressed to the user of user equipment 100, such as electronic communication 102.

Process 700 may continue to 706, where the media guidance application determines that content of the electronic communication (e.g., electronic communication 102) references travel. For example, an e-mail such as electronic communication 102 may indicate that a user is going to travel to Milan, Italy (e.g., destination 110). This determination was described in further detail in the foregoing. Process 700 may continue to 708, where the media guidance application may identify, based on the profile, a home address of the first user. For example, the profile, which may be stored on storage 408, may indicate a home address of the first user.

Process 700 may continue to 710, where the media guidance application may parse the content of the electronic communication to identify an address other than the home address. For example, if the home address is in New York, USA, and electronic communication 102 indicates both New York, USA, and Milan, Italy, the media guidance application may learn that Milan, Italy is an address other than the home address, and thus is a travel destination. Thus, process 700 may continue to 712, where, in response to identifying the address other than the home address, the media guidance application may determine the second geographic location to be the address other than the home address. The media guidance application may thereafter execute other functionality described herein to ensure that content that is restricted in Milan, Italy is available to the user while the user is in Milan, Italy.

Figure 8:
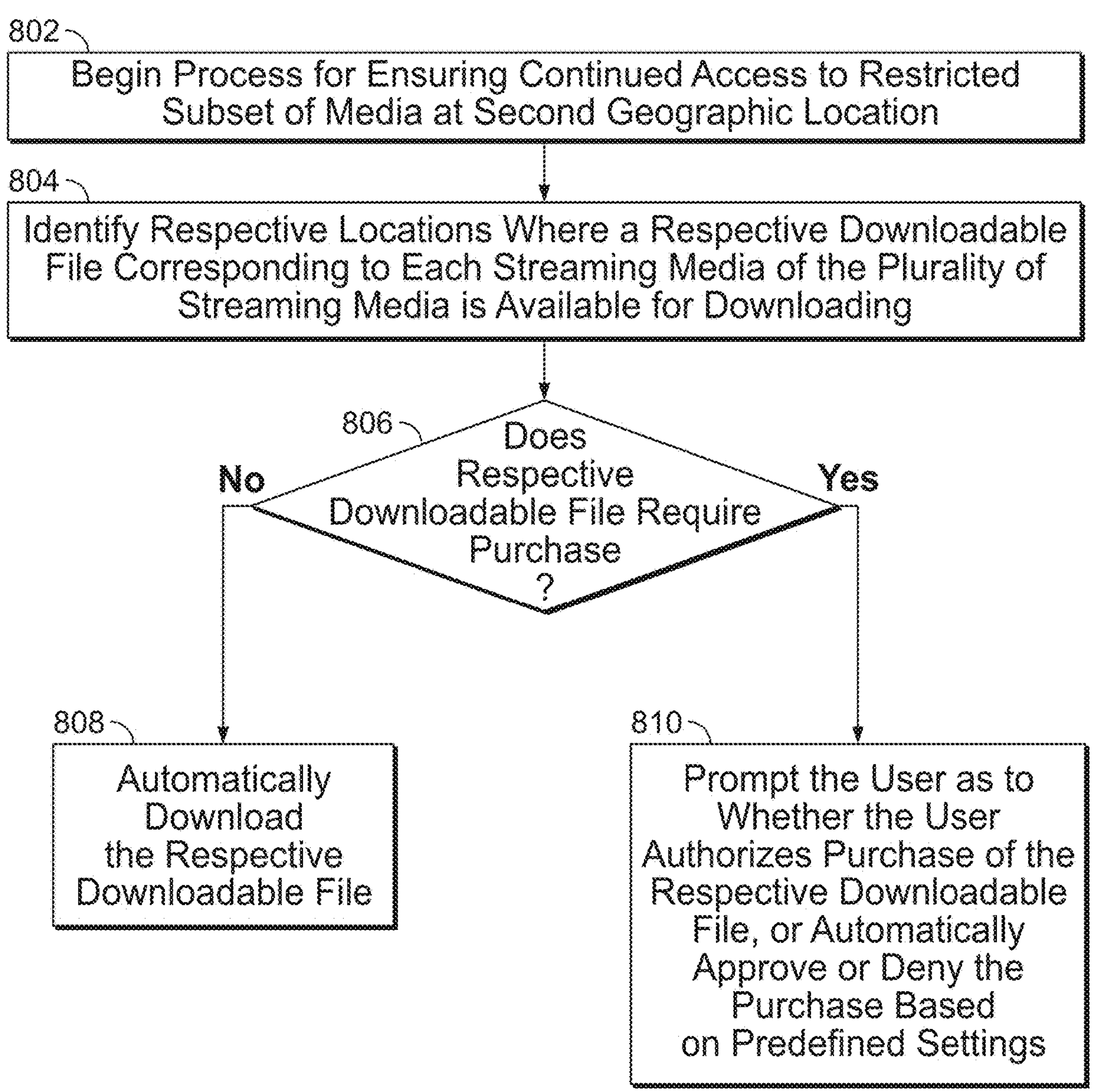
FIG. 8 depicts an illustrative flowchart of a process for ensuring continued access to restricted subset of media at a second geographic location, in accordance with some embodiments of the disclosure.

FIG. 8 depicts an illustrative flowchart of a process for ensuring continued access to restricted subset of media at a second geographic location, in accordance with some embodiments of the disclosure. Process 800 begins at 802, where the media guidance application executed by control circuitry 404 of user equipment 100 begins a process for ensuring continued access to restricted subset of media at second geographic location. Process 800 continues to 804, where the media guidance application may identify respective locations where a respective downloadable file corresponding to each streaming media of the plurality of streaming media is available for downloading. For example, the media guidance application may determine that downloadable files are available from media content source 516, which may be a database for one or more media asset stores or free repositories, such as the Apple iTunes store, or a library that allows free downloading or borrowing of digital media.

Process 800 may continue to 806, where the media guidance application may determine whether the respective downloadable file requires purchase. If the respective downloadable file does not require purchase, process 800 may continue to 808, where the media guidance application may automatically download the respective downloadable file. If the respective downloadable file does require purchase, process 800 may continue to 810, where the media guidance application may prompt the user (e.g., by way of prompt 106) as to whether the user authorizes purchase of the respective downloadable file, or the media guidance application may automatically approve or deny the purchase based on predefined settings, as is described in the foregoing.

It should be noted that processes 600-800 or any step thereof could be performed on, or provided by, any of the devices shown in FIGS. 1 and 4-5. For example, any of processes 600-800 may be executed by control circuitry 404 (FIG. 4) as instructed by control circuitry implemented on user equipment 502, 504, and/or 506 (FIG. 5) in order to ensure seamless access to restricted media. In addition, one or more steps of processes 600-800 may be incorporated into or combined with one or more steps of any other process or embodiment.

It is contemplated that the steps or descriptions of each of FIGS. 6-8 may be used with any other embodiment of this disclosure. In addition, the steps and descriptions described in relation to FIGS. 6-8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 4-5 could be used to perform one or more of the steps in FIGS. 6-8.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present invention may be executed using processing circuitry. For instance, determining that a user is traveling to a destination may be performed, e.g., by processing circuitry 406 of FIG. 4. The processing circuitry, for instance, may be a general purpose processor, a customized integrated circuit (e.g., an ASIC), or a field-programmable gate array (FPGA) within user equipment 400, media content source 516, or media guidance data source 518. For example, a profile, as described herein, may be stored in, and retrieved from, storage 408 of FIG. 4, or media guidance data source 518 of FIG. 5. Furthermore, processing circuitry, or a computer program, may update settings associated with a user, such as a user's download preferences, stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A computer implemented method comprising:

storing a media content item in a first portion of memory within device that is accessible for playing;

detecting that the device has entered a geographic location that is associated with a rule that restricts playing the media content item;

based at least in part on the detecting that the device has entered the geographic location that is associated with the rule that restricts playing the media content item:

transferring the media content item to a second portion of the memory within the device that is inaccessible for playing.

2. The method of claim 1, further comprising:

detecting that the device has left the geographic location;

based at least in part on the detecting that the device has left the geographic location, transferring the media content item to the first portion of memory within the device that is accessible for playing.

3. The method of claim 1, further comprising:

before the detecting that the device has entered the geographic location, determining that the device is likely in future to be entering the geographic region; and based at least in part on the determining that the device is likely in future to be entering the geographic region, storing a playlist of media content items on the device, wherein the playlist includes the media content item.

4. The method of claim 1, further comprising:

before the detecting that the device has entered the geographic location, transmitting the media content item for storage at the device, wherein the device is selected among a plurality of devices associated with a user profile based at least in part on a size and capacity of each of the plurality of devices.

5. The method of claim 1, wherein the media content item is a first media content item that is part of a playlist of media content items comprising a second media content, wherein while the first media content item is inaccessible, consuming the second media content item on the playlist is enabled.

6. The method of claim 1, wherein the detecting that the device has entered the geographic location that is associated with the rule that restricts playing the media content item comprises:

parsing electronic communications from a third-party platform indicating that the geographic location is associated with the rule that restricts playing the media content item.

7. The method of claim 1, wherein the detecting that the device has entered the geographic location that is associated with the rule that restricts playing the media content item comprises:

accessing a database indicating geographic content restrictions for a content provider.

8. The method of claim 1, wherein the device is one of a plurality of devices associated with a user profile, and the method comprises:

selecting the device among a plurality of devices associated with the user profile based at least in part on a historical record of travel for the device.

9. The method of claim 1, wherein the device is one of a plurality of devices associated with a user profile, and the method further comprises:

selecting the device among the plurality of devices based on a storage capacity of the device.

10. A system comprising:

a memory comprising a first portion and a second portion; and control circuitry configured to:

store a media content item in the first portion of the memory within a device, wherein the first portion of the memory is accessible for playing;

detect that the device has entered a geographic location that is associated with a rule that restricts playing the media content item;

based at least in part on the detecting that the device has entered the geographic location that is associated with the rule that restricts playing the media content item:

transferring the media content item to the second portion of the memory within the device, wherein the second portion of the memory is inaccessible for playing.

11. The system of claim 10, wherein the system is configured to:

detect that the device has left the geographic location;

based at least in part on the detecting that the device has left the geographic location, transfer the media content item to the first portion of memory within the device that is accessible for playing.

12. The system of claim 10, wherein the system is configured to:

before the detecting that the device has entered the geographic location, determine that the device is likely in future to be entering the geographic region; and based at least in part on the determining that the device is likely in future to be entering the geographic region, store a playlist of media content items on the device, wherein the playlist includes the media content item.

13. The system of claim 10, wherein the system is configured to:

before the detecting that the device has entered the geographic location, transmit the media content item for storage at the device, wherein the device is selected among a plurality of devices associated with a user profile based at least in part on a size and capacity of each of the plurality of devices.

14. The system of claim 10, wherein the media content item is a first media content item that is part of a playlist of media content items comprising a second media content, wherein while the first media content item is inaccessible, consuming the second media content item on the playlist is enabled.

15. The system of claim 10, wherein the detecting that the device has entered the geographic location that is associated with the rule that restricts playing the media content item comprises: parsing electronic communications from a third-party platform indicating that the geographic location is associated with the rule that restricts playing the media content item.

16. The system of claim 10, wherein the detecting that the device has entered the geographic location that is associated with the rule that restricts playing the media content item comprises: accessing a database indicating geographic content restrictions for a content provider.

17. The system of claim 10, wherein the device is one of a plurality of devices associated with a user profile, and wherein the system is configured to:

select the device among a plurality of devices associated with the user profile based at least in part on a historical record of travel for the device.

18. The system of claim 10, wherein the device is one of a plurality of devices associated with a user profile, and wherein the system is configured to:

select the device among the plurality of devices based on a storage capacity of the device.

* * * * *